United States Patent [19]
Ishigami et al.

[11] 3,992,510
[45] Nov. 16, 1976

[54] METHOD FOR RECOVERY OF IODINE

[75] Inventors: Masahisa Ishigami, Kakogawa; Kunio Arimoto, Takasago; Yoshikazu Inoue; Ryoichi Fujii, both of Kakogawa, all of Japan

[73] Assignee: Harima Chemicals, Inc., Kakogawa, Japan

[22] Filed: May 6, 1975

[21] Appl. No.: 575,005

[30] Foreign Application Priority Data
Sept. 18, 1974  Japan................................ 49-108214

[52] U.S. Cl. .................................. 423/500; 423/499; 423/551
[51] Int. Cl.[2] ....................... C01B 7/14; C01D 3/12; C01D 5/00
[58] Field of Search ..................... 423/500, 499, 551

[56] References Cited
UNITED STATES PATENTS

| | | |
|---|---|---|
| 1,249,863 | 12/1917 | Vincent ........................... 423/499 X |
| 1,604,153 | 10/1926 | Ellinger ............................... 423/499 |
| 1,944,423 | 1/1934 | Girvin ............................ 423/500 X |
| 2,385,483 | 9/1945 | Wolff .................................. 423/500 |
| 3,346,331 | 10/1967 | Nakamura et al. ................. 423/501 |
| 3,352,641 | 11/1967 | Nakamura et al. ................. 423/501 |

FOREIGN PATENTS OR APPLICATIONS

| | | |
|---|---|---|
| 41-6569 | 4/1966 | Japan ................................. 423/500 |
| 110,555 | 10/1917 | United Kingdom ................. 423/500 |

OTHER PUBLICATIONS
Jacobson's "Encyclopedia of Chemical Reactions", vol. 3, 1949 Ed., p. 725, Reinhold Pub. Corp., N.Y.

*Primary Examiner*—Edward Stern
*Attorney, Agent, or Firm*—Moonray Kojima

[57] ABSTRACT

A process for recovery of iodine from waste containing iodine or iodine compound, comprising the steps of burning the waste in a cumbustion chamber, and scrubbing out the iodine or iodine compound in the resulting combustion gas with a basic aqueous solution of sodium thiosulfate.

5 Claims, 1 Drawing Figure

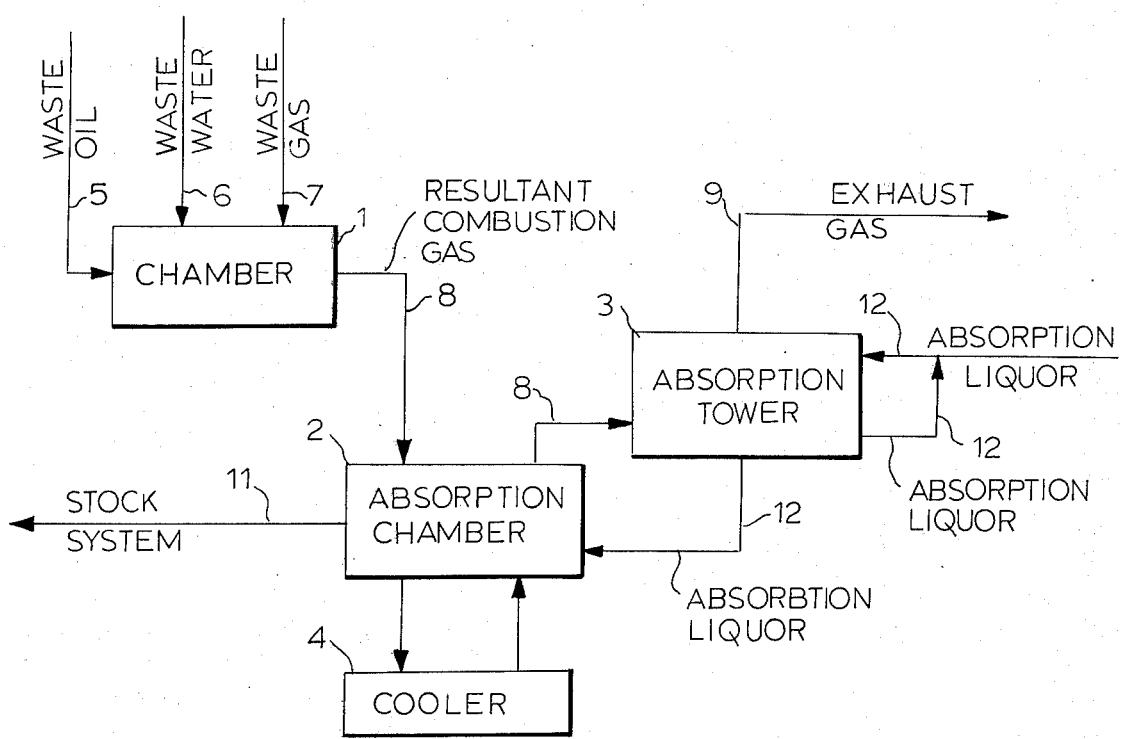

METHOD FOR RECOVERY OF IODINE

BACKGROUND OF THE INVENTION

This invention relates to a method of recovering iodine contained in waste material.

Iodine is often used as a catalyst in dehydrogenation or isomerization of organic substance and is itself very expensive. When iodine or iodine compound is used industrially as a catalyst it is financially advisable to recover it from waste. Moreover, it is well known that iodine, when absorbed into the human system, may cause various toxic symptoms, and that iodine compounds, such as methyliodide, ethyliodide, which are usually generated during various chemical reactions in the presence of iodine, are poisonous to the human body.

Therefore, at chemical plants which use iodine as a catalyst for reaction of organic substances, there exist problems which require immediate attention. The iodine should be recovered on an economical basis. Such recovery from plant waste will aid and control pollution problems.

Many suggestions relating to recovery of iodine have been published. For example, in Japanese Patent Publication Nos. 5814/1971 and 35244/1971, there are described an absorbent for recovery of radioactive iodine existing as alkyliodides. Japanese Patent Publication No. 42357/1973 describes a method for iodine recovery, wherein reaction exhaust gas mixture generated by gaseous dehydrogenation reaction of organic substances, in the presence of iodine as a catalyst, is contacted with copper oxide at high temperature to give iodinated copper oxide, and iodine is liberated from the iodinated copper oxide by oxidation using an oxidation agent. Japanese Patent Publication No. 31180/1973 describes a method for recovering iodine from gas by converting iodine contained in the gas to non-volatile iodic acid by contacting the gas with aqueous solution of nitric acid of at least 15.3 N concentration.

In each of the prior methods, however, there is a disadvantage or defect which prevents widespread useage on an industrial scale.

SUMMARY OF THE INVENTION

Accordingly, an object of the invention is to eliminate the disadvantages and defects of the prior art.

The foregoing and other objects of the invention are attained by the invention which encompasses a new process for recovering iodine or iodine compound contained in waste material, comprising the steps of burning the waste material in a combustion chamber and then passing the resulting combustion gas through a basic aqueous solution of sodium thiosulfate to react the iodine to produce sodium iodide which may then be conventionally precipitated out as free iodine, as will be further described hereinafter.

A feature of the invention is the burning of waste material containing iodine or iodine compound and passing the resulting combustion gas through a basic aqueous solution of sodium thiosulfate.

A further feature of the invention is the burning of the waste material at a temperature above 500° C, and preferably above 800° C.

Another feature of the invention is the form of waste material, being waste oil, waste water, or waste gas.

A further feature of the invention is the reaction of iodine or iodine compound contained in the waste material with the basic aqueous solution of sodium thiosulfate to produce sodium iodide and its subsequent recovery therefrom as free iodine by making the solution acidic, chlorinating and precipitating.

Another feature is the passing of combustion gas through an absorbing liquor in two chambers with the absorbing liquor in the second chamber used subsequently in the first chamber.

The foregoing and other features and advantages of the invention will become more apparent when considered together with the drawing and detailed description contained hereinbelow.

BRIEF DESCRIPTION OF DRAWING

The sole FIGURE of the drawing depicts a flow diagram for carrying out the invention.

DETAILED DESCRIPTION OF PREFERRED EMBODIMENTS

Generally, in organic reactions in the presence of an iodine catalyst, the iodine catalyst may be converted into a mixture of free iodine, hydrogen iodide and organic iodine compounds of which those having lower boiling point components would be discharged with exhaust gas, and other components would be discharged as waste, such as waste oil, waste water, etc. The above mentioned organic iodine compounds include iodine compounds of lower hydrocarbon such as methyliodide, emthyliodide, propyliodide, iodine addition compound and iodine substitution compound.

According to the present invention iodine can be recovered in a form of iodide of alkali metal with excellent recovery rate from either waste oil, waste water, or waste gas, all of which may contain iodine in the form of free iodine or iodine compounds. Free iodine can be liberated and recovered from the iodide of alkali metal using conventional methods.

A practical embodiment of the invention will now be explained in connection with the sole FIGURE of the drawing.

Waste oil 5 (or waste water 6, or waste gas 7) containing iodine or iodine compound is feed into combustion chamber 1 to be burned. When the waste oil is less combustible or incombustible, some fuel oil may be admixed therewith and burned keeping the temperature of the combustion chamber 1 at more than 500° C, and preferably more than 800° C. The waste oil 5 may be burned in the combustion chamber admixed with a fixed quantity of waste water 6 and/or waste gas 7, all of which may contain iodine or iodine compound. The iodine compound contained in waste oil 5, waste water 6, or waste gas 7, becomes free iodine by oxidation decomposition resulting from burning. The resultant combustion gas 8 containing the free iodine is led to absorption chamber 2, which is suitably filled with absorption liquor 12, consisting essentially of basic aqueous solution of sodium thiosulfate. The free iodine in the combustion gas 8 is absorbed and converted to sodium iodide by reacting with sodium thiosulfate, in accordance with the equation shown below. If desired, absorption liquor in the absorption liquor in absorption chamber 2 may be cooled by cooler 4 to an optimum temperature. After absorption treatment in the absorption chamber 2, unabsorbed combustion gas 8 is further led to absorption tower 3 to absorb and react iodine remaining in the gas and thereafter the remaining gas may be discharged as exhaust gas 9 from tower 3 to the external air. Absorption liquor 12 is continuously fed into absorption tower 3 from an external source not shown, and after circulation in tower 3, is successively fed into the absorption chamber 2. Thus, the absorption liquor is used to absorb any unreacted gas from chamber 2 before being supplied to chamber 2 for the primary reacting. After absorbing iodine in absorption chamber 2, the liquor is discharged continuously from chamber 2 into stock system 11, to recover sodium iodide. The concentration of sodium iodide in the recovered liquor is maintained at a substantially constant value.

Since iodine is irreversibly absorbed into the absorption liquor of sodium thiosulfate solution, both in the absorption chamber 2 and the absorption tower 3, there is very little free iodine that is lost through exhaust gas 9. It has been found that exhaust gas 9 contains iodine in an amount of less than 1 mg/m³, and advantageously, the recovery rate is excellent.

The resultant liquor after reaction with iodine essentially contains sodium sulfate, and sodium iodide with a small quantity of sodium carbonate, sodium bicarbonate and unreacted sodium thiosulfate. Iodine may be recovered from this resultant liquor by any conventionally known process. For example, after making the liquor acidic, chlorine gas may be blown into the liquor to precipitate free iodine. Advantageously, the process is simple and inexpensive.

Iodine reacts with sodium thiosulfate in neutral or acidic solution according to the equation (I).

$$2Na_2S_2O_3 + I_2 = Na_2S_4O_6 + 2NaI \qquad (I)$$

However, in accordance with the present invention, a basic solution of sodium thiosulfate is used, and the reaction is according to the equation (II).

$$Na_2S_2O_3 + 4I_2 + 10NaOH = 2Na_2SO_4 + 8NaI + 5H_2O \qquad (II)$$

Thus, advantageously, using a basic system, one mole of sodium thiosulfate reacts with four moles of iodine accompanied by only a small amount of inevitable oxidation decomposition resulting from ambient oxygen. Thus, large consumption of sodium thiosulfate can be avoided in the inventive iodine recovery process.

Iodine element is very corrosive to all kinds of metals except Hastelloy C (Ni 54.5–59.5; Mo 15–19; C 0.04–0.15; Fe 4–7; Cr 13–16; W 3.5–5.5). Thus, it is very difficult to select proper non-corrosive materials for constructing an iodine recovery apparatus. On the other hand, according to the present invention, etching action of iodine may be much restricted due to the basic and reducing condition of the absorption liquor both in the absorption chamber and the absorption tower, as above discussed. Advantageously, selection of construction material, construction design, and maintenance are readily facilitated, in contrast to the prior art.

The invention is further illustrated by actual examples which are to be construed to be illustrative and not in any way limiting of the invention.

EXAMPLE 1

120 liter/hour of solvent of hydrocarbon containing 5% methyl iodide was burned in a combustion chamber 1 with air of 1800 m³/hour flow rate. The resultant combustion gas 8 was led directly to absorption chamber 2, and thence led to absorption tower 3 and exhausted out to the open air.

The temperature of the combustion chamber 1 was kept at 950° C by controlling water sprayed into the chamber, while temperature of the absorption chamber and the absorption tower were both kept at 85° C. Absorption liquor level in the absorption chamber was controled to be kept at a constant height by conducting continuous water supplying to the chamber at a fixed quantity flow rate. Now to the absorption tower 3, a fixed amount of absorption aqueous solution containing sodium thiosulfate 2.5% and sodium hydroxide 4% was continuously fed, and from absorption chamber 2 resultant reacted solution containing sodium iodide was discharged continuously in order to keep the sodium iodide concentration of the absorption aqueous solution in the chamber 2 at a substantially constant value.

Free iodine content of the exhaust gas 9 discharged into the atmosphere was measured by using the method described hereinbelow. Iodine content of the exhaust gas was 0.3 mg/m³ and iodine loss in the process was less than 0.1%.

The iodine content of the exhaust gas was measured by passing exhaust gas of 5 liters through a glass filter kept at 85°–90° C, then leading into 10 ml of neutral aqueous solution of potassium iodide in a small impinger, and measuring absorption of 352 m by ultra violet spectrometer and iodine content in the exhaust gas was established then from the standard calibration curve of the spectrometer results.

EXAMPLE 2.

Wasteoil, which was distilled from a system of disproportionation of rosin in the presence of iodine as a catalyst, and containing iodine 3% and alkyl-iodide 25%, was diluted with addition of kerosene to make its iodine content about 5%. The resultant mixture was burned in combustion chamber 1 as in Example 1. Waste gas, which was generated in a disproportionation reaction system, and containing methyl iodide and hydrogen iodide as iodine of a maximum of 800 mg/m³, was led into combustion chamber 1. Also, waste water containing 0.2% of iodine, was led into combustion chamber 1. The chamber was sprayed with water to keep its temperature at 950° C. The operations of both the absorption chamber 2 and absorption tower 3 were controlled under the conditions of Example 1.

Free iodine content in the exhaust gas 9 exhausted into open air was measured and found to be 0.2 mg/m³ and iodine loss in the process was less than 0.1%.

The waste oil, waste gas and waste water were also tested individually and produced the same advantageous low iodine content in the exhaust gas and low iodine loss.

According to the present invention, it is readily apparent that the iodine content in the exhaust gas is surprisingly low, and the recovery of iodine from the waste material is highly efficient. Moreover, many different materials and designs can be selected for the recovery apparatus since the problem of iodine corrosion is substantially eliminated.

The foregoing description is illustrative of the principles of the invention. Numerous other variations and modifications would be readily apparent to the worker skilled in the art. All such variations and modifications are to be considered to be within the spirit and scope of the invention.

What is claimed is:

1. A process of recovering iodine from waste material containing iodine or iodine compound, comprising the steps of burning said waste material in a combustion chamber thereby producing combustion gas containing iodine, passing said combustion gas through a solution containing an agent which reacts with said iodine and thereby produce an iodine compound, and recovering iodine from said iodine compound by acidifying the resulting solution, then chlorinating said resulting solution thereby to precipitate iodine from said resulting solution, characterized in that said solution containing said agent is a solution of a basic aqueous sodium hydroxide solution of sodium thiosulphate, and said produced iodine compound is sodium iodide, and the reaction product consists essentially of said sodium iodide and sodium sulfate and the reaction being according to the equation $$Na_2S_2O_3 + 4I_2 + 10 NaOH \rightarrow Na_2SO_4 + 8 NaI + 5H_2O.$$

2. Process of claim 1, wherein said waste material is waste oil, waste water, or waste gas containing free iodine or iodine compound.

3. Process of claim 1, wherein said combustion chamber is at a temperature of more than 500° C.

4. Process of claim 1, wherein said combustion chamber is at a temperature of more than 800° C.

5. Process of claim 1, wherein said combustion gas containing said free iodine is passed through said basic aqueous solution to react with said sodium thiosulfate and the unreacted combustion gas is again passed through a basic aqueous solution of said sodium thiosulfate and then vented as exhaust gas, said basic solution then being circulated to react primarily with said combustion gas supplied directly from said combustion chamber.

* * * * *